United States Patent [19]

Cox et al.

[11] 4,194,785

[45] Mar. 25, 1980

[54] CAMPER

[76] Inventors: Don Cox; Gail Cox, both of Box 73, Sharon, Okla. 73857

[21] Appl. No.: 929,898

[22] Filed: Aug. 1, 1978

[51] Int. Cl.$^2$ .............................................. B60P 3/34
[52] U.S. Cl. .................. 296/169; 135/4 A; 296/27
[58] Field of Search ............. 296/10, 23 R, 23 H, 296/23 F, 23 G, 23 MC, 27, 161, 168, 169, 170; 135/1 A, 3 A, 4 A, 5 A

[56] References Cited

U.S. PATENT DOCUMENTS

| Re. 27,605 | 3/1973 | Laney | 296/23 R |
|---|---|---|---|
| 3,466,082 | 9/1969 | Branch | 296/23 R |
| 3,583,755 | 6/1971 | Hedrick | 296/27 |
| 3,697,122 | 10/1972 | Richards | 296/23 R |
| 3,738,699 | 6/1973 | Fain | 296/23 R |
| 3,788,670 | 1/1974 | Petersen | 296/23 G |
| 3,823,975 | 7/1974 | Cooper | 296/23 R |
| 3,940,175 | 2/1976 | Robison | 296/22 |
| 4,079,956 | 3/1978 | Headington | 296/23 R |
| 4,113,301 | 9/1978 | Olmstead | 296/23 H |

*Primary Examiner*—Robert R. Song
*Assistant Examiner*—John A. Carroll
*Attorney, Agent, or Firm*—Daniel Jay Tick

[57] ABSTRACT

A pair of rectangular parallelepiped boxes are affixed to the oversurface of a base member which is mounted on wheels. Each of the boxes is positioned at a corresponding one of a first pair of sides and extends between a second pair of sides of the base member. Each of the boxes has a top and an open end at one of the second pair of sides. The open ends are selectively coverable by doors. A bed support member covers the camper by resting on top of the boxes and extending therebetween when the camper is in transit and resting on the tops at the other of the second pair of sides when the camper is assembled. A plurality of support devices are provided on the bed support member and on the top of the boxes for supporting tubular brace members for maintaining the bed support member level above the ground and for supporting arcuate tent support members for maintaining a tent above the base member and the bed support member. A plurality of legs are foldably mounted on the undersurface of the base member. A cooking unit, a food chest, a cooling chest and a table top are removably stored in the boxes.

1 Claim, 6 Drawing Figures

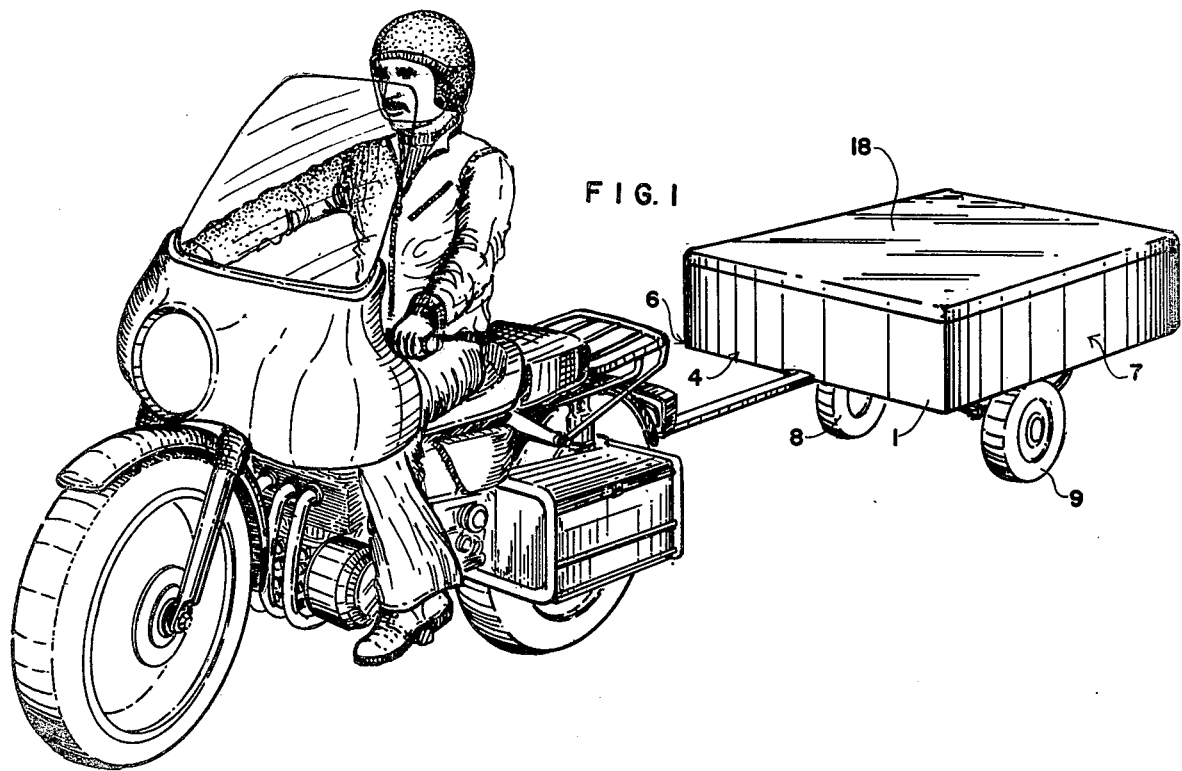
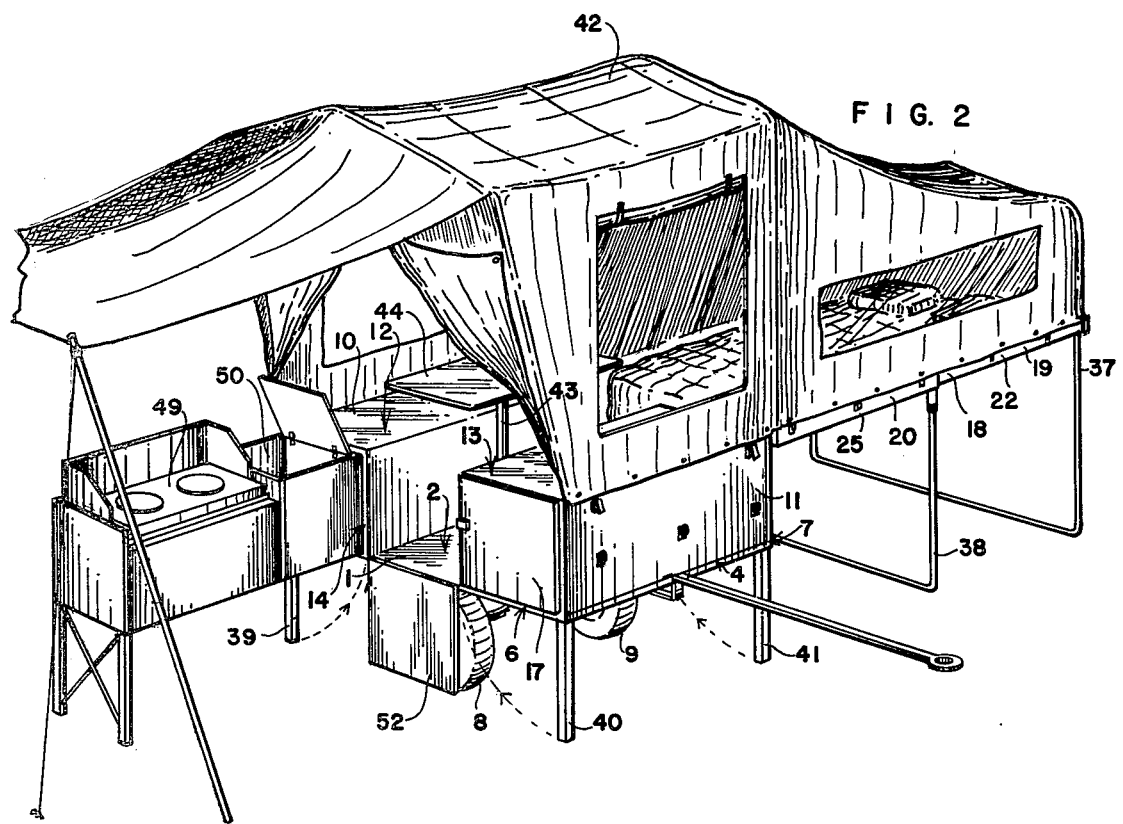

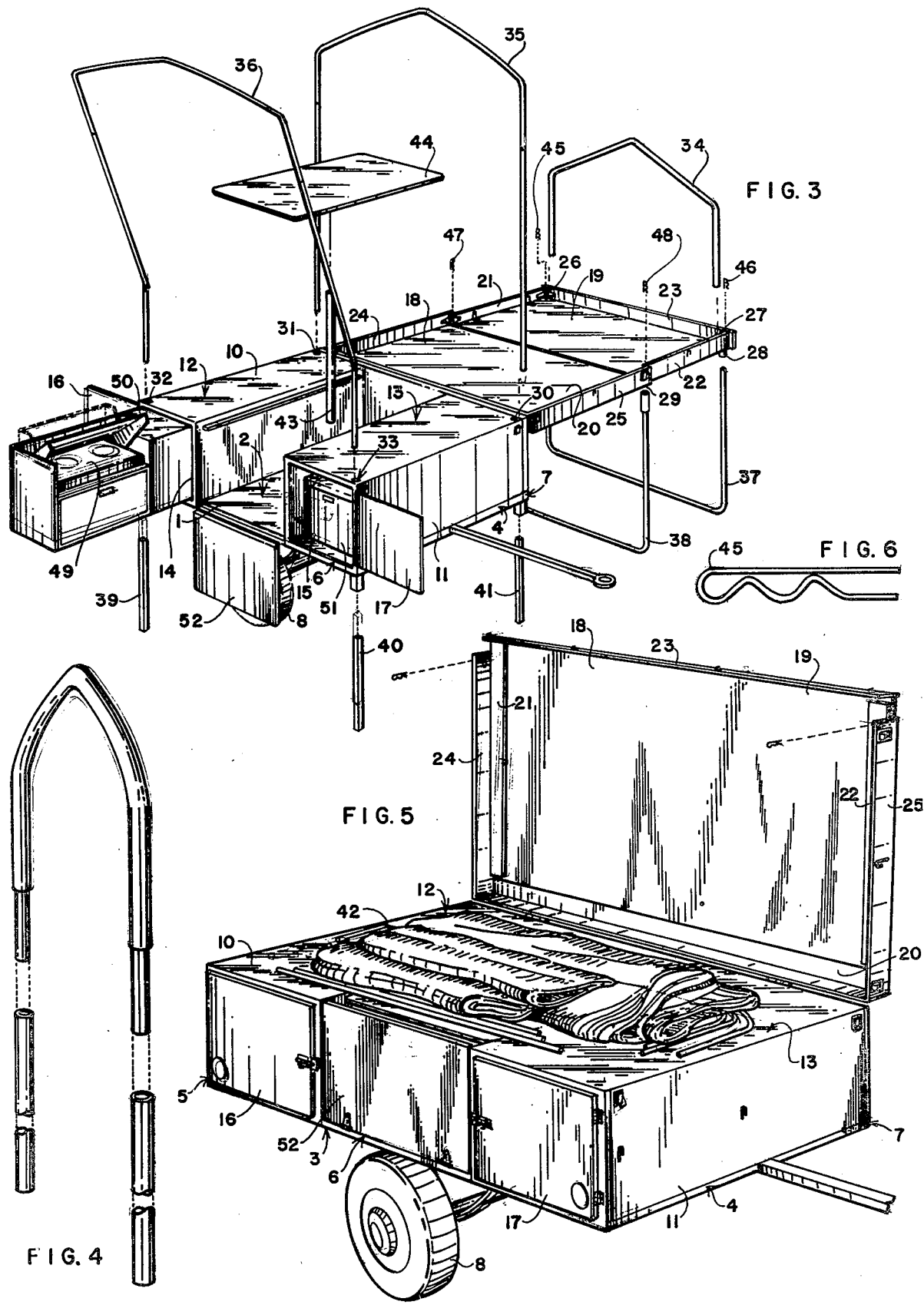

CAMPER

BACKGROUND OF THE INVENTION

The present invention relates to a camper. More particularly, the invention relates to a camper adapted to be towed by a motorcycle.

Campers of the type described herein are disclosed in U.S. Pat. Nos. 2,582,635; 2,719,054; 3,065,019; 3,095,231; 3,823,975 and 3,913,968.

Objects of the invention are to provide a camper adapted to be towed by a motorcycle, which camper is of simple structure, inexpensive in manufacture, compact, light in weight, readily towed by a motorcycle without stress or strain, and functions effectively, efficiently and reliably to provide the basic necessities of a camper.

BRIEF DESCRIPTION OF THE DRAWINGS

In order that the invention may be readily carried into effect, it will now be described with reference to the accompanying drawings, wherein:

FIG. 1 is a perspective view of an embodiment of the camper of the invention in transit, being towed by a motorcycle;

FIG. 2 is a perspective view of the embodiment of FIG. 1 in assembled position for use;

FIG. 3 is a perspective view, of the embodiment of FIG. 1 in the process of assembly or disassembly;

FIG. 4 is a perspective view, on an enlarged scale, of a tent support member of the camper of the invention;

FIG. 5 is a perspective view of the embodiment of FIG. 1 in condition for immediate transit or assembly; and FIG. 6 is a view, on an enlarged scale, of a pin utilized in securing the parts of the bed support member of the camper to each other.

DETAILED DESCRIPTION OF THE INVENTION:

The camper of the invention is adapted to be towed by a motorcycle.

The camper of the invention comprises a base member 1 (FIGS. 1 to 3) of substantially planar rectangular configuration having an oversurface 2 (FIGS. 2 and 3) and an undersurface 3 (FIG. 5). The base member 1 also has a first pair of spaced parallel sides 4 and 5 (FIG. 5) and a second pair of spaced parallel sides 6 and 7 perpendicular to the first pair of sides (FIGS. 1 to 3 and 5).

A pair of wheels 8 and 9 are rotatably mounted on the undersurface 3 of the base member 1, as shown in FIGS. 1 and 2.

A pair of rectangular parallelepiped boxes 10 and 11 (FIGS. 2, 3 and 5) are affixed to the oversurface 2 of the base member 1 at the sides 5 and 4, respectively. The boxes 10 and 11 extend between the sides 6 and 7 and have tops 12 and 13, respectively (FIGS. 2, 3 and 5). The boxes 10 and 11 have open ends 14 and 15, respectively, as shown in FIGS. 2 and 3, at the side 6 of the base member 1. The open ends 14 and 15 of the boxes 10 and 11, respectively, are selectively coverable by doors 16 and 17, respectively (FIGS. 3 and 5).

A bed member 18 (FIGS. 1 to 3 and 5) covers the camper by resting on the tops 12 and 13 of the boxes 10 and 11, respectively, and extends between said boxes when the camper is in transit, as shown in FIGS. 1 and 5. The bed support member 18 rests on the tops 12 and 13 of the boxes 10 and 11, respectively, at the side 7 of the base member 1, as shown in FIGS. 2 and 3, when the camper is assembled. The bed support member 18 preferably comprises a pair of rectangular plate-like members 19 and 20 (FIGS. 2, 3 and 5) which are telescopically coupled to each other, so that in transit position, as shown in FIG. 5, they are in substantial juxtaposition with each other and in assembled position, as shown in FIGS. 2 and 3, they are extendible to form a full-sized bed support platform. The members 19 and 20 of the bed support member 18 are preferably bordered by ledges 21, 22 and 23, and 24 and 25, respectively, as shown in FIGS. 3 and 5.

A plurality of support devices 26, 27, 28, 29, 30, 31, 32, 33 are provided on the bed support member 18 and on the tops 12 and 13 of the boxes 10 and 11, respectively, as shown in FIG. 3, for supporting tubular brace members 34, 35, 36, 37 and 38 (FIG. 3).

A plurality of legs 39, 40, and 41 (FIGS. 2 and 3) and a fourth leg (not shown in the FIGS.) are foldably mounted on the undersurface 3 of the base member 1, as indicated in FIG. 2.

A plurality of tubular brace members 37 and 38 are removably supported by the support devices 28 and 29, and so on (FIG. 3), of the bed support member 18 for maintaining the bed support member level above the ground, in the manner shown in FIGS. 2 and 3. A plurality of tubular generally arcuate tent support members 34, 35 and 36 are removably supported by the support devices 26 and 27 of the bed support member 18 and by the support devices 30 to 33 of the boxes 10 and 11, as shown in FIG. 3, for maintaining a tent 42 (FIGS. 2 and 5) above the base member 1 and the bed support member 18, as shown in FIG. 3. The support devices comprise cylindrical socket members in which the free ends of the braces are seated. A tubular brace member 3 (FIGS. 2 and 3) is supported by a support device (not shown in the FIGS.) on the oversurface 2 of the base member 1 and supports a table top 44 (FIGS. 2 and 3) at a suitable distance above said oversurface, so that people sitting on the tops 12 and 13 of the boxes 10 and 11, respectively, may comfortably use the table top for desired purposes such as, for example, eating, writing, playing games, and so on.

The brace members preferably are provided in several parts, in the manner shown in FIG. 4, so that they may be readily assembled and disassembled to form the completed brace members and to occupy a minimum space in transit.

A plurality of pins, of the type shown in FIG. 6, are preferably utilized to secure various components of the camper to each other in assembled position. Thus, as illustrated in FIG. 3, the pins 45 and 46 are utilized to secure the back ledge 23 to the member 19 of the bed support member and the pins 47 and 48 are utilized to secure the members 19 and 20 of the bed support member 18 to each other in their assembled positions.

A cooking unit 49 (FIGS. 2 and 3) and a food chest 50 (FIGS. 2 and 3) are removably stored in the box 10. A cooling chest 51 (FIG. 3) is removably stored in the box 11.

A door 52 is hingedly affixed to the base member 1 at its edge 6, as shown in FIGS. 2, 3 and 5, so that it is closable to form an additional storage space between the boxes 10 and 11, as shown in FIGS. 2 and 3, for storing several components and items in transit. When the door 52 is opened, as shown in FIGS. 2 and 3, the additional space between the boxes is utilized to accommodate people seated on such boxes.

While the invention has been described by means of a specific example and in a specific embodiment, we do not wish to be limited thereto, for obvious modifications will occur to those skilled in the art without departing from the spirit and scope of the invention.

We claim:

1. A camper adapted to be towed by a motorcycle, said camper comprising
    a base member of substantially planar rectangular configuration having an oversurface, an undersurface, a first pair of spaced parallel sides and a second pair of spaced parallel sides perpendicular to the first pair of sides;
    a pair of wheels rotatably mounted on the undersurface of the base member, said wheels being rotatable in planes parallel to the second pair of sides of said base member;
    a pair of rectangular parallelepiped boxes affixed to the oversurface of the base member each extending along a corresponding one of the first pair of sides and extending from one of the second pair of sides to the other and each having a top and an open end at one of the second pair of sides selectively coverable by a door;
    a bed support member covering the camper by resting on the tops of the boxes and extending therebetween when the camper is in transit and resting at one end of said bed support member on said tops at the other of said second pair of sides when the camper is assembled whereby in its assembled position said bed support member is substantially in the plane of the tops of said boxes and extends beyond said base member from said other of said second pair of sides;
    a plurality of support devices on the bed support member and on the tops of the boxes for supporting tubular brace members;
    a plurality of legs foldably mounted on the undersurface of the base member;
    a plurality of tubular brace members removably supported by some of the support devices of the bed support member for maintaining said bed support member level above the ground;
    a plurality of tubular generally arcuate tent support members removably supported by others of the support devices of the bed support member and by the support devices of the boxes for maintaining a tent above the base member and the bed support member; and
    a cooking unit, a food chest, a cooling chest and a table top removably stored in said boxes.

* * * * *